US010145359B2

(12) United States Patent
Kövesdi et al.

(10) Patent No.: US 10,145,359 B2
(45) Date of Patent: Dec. 4, 2018

(54) DRIVETRAIN AND METHOD FOR DRIVES HAVING WIDELY SPACED OEPRATING POINTS

(71) Applicant: ENERKITE GMBH, Kleinmachnow (DE)

(72) Inventors: Peter Kövesdi, Berlin (DE); Jan-Eike Dreier, Löhne (DE)

(73) Assignee: ENERKITE GMBH, Kleinmachnow (DE)

( * ) Notice: Subject to any disclaimer, the term of this patent is extended or adjusted under 35 U.S.C. 154(b) by 309 days.

(21) Appl. No.: 14/916,002

(22) PCT Filed: Sep. 2, 2014

(86) PCT No.: PCT/EP2014/002379
§ 371 (c)(1),
(2) Date: Mar. 2, 2016

(87) PCT Pub. No.: WO2015/032491
PCT Pub. Date: Mar. 12, 2015

(65) Prior Publication Data
US 2016/0201768 A1    Jul. 14, 2016

(30) Foreign Application Priority Data
Sep. 5, 2013 (EP) .................................... 13004353

(51) Int. Cl.
F03D 5/06 (2006.01)
F16H 3/72 (2006.01)

(52) U.S. Cl.
CPC ...... F03D 5/06 (2013.01); F05B 2260/40311 (2013.01); F16H 3/724 (2013.01);
(Continued)

(58) Field of Classification Search
None
See application file for complete search history.

(56) References Cited

U.S. PATENT DOCUMENTS 5,222,924 A * 6/1993 Shin .......................... F16H 1/46
416/124
5,433,282 A 7/1995 Moroto et al.
(Continued)

FOREIGN PATENT DOCUMENTS

CA   2 730 939 A1   1/2010
DE   32 09 368 A1   9/1983
(Continued)

OTHER PUBLICATIONS

International Search Report Corresponding to PCT/EP2014/002379 dated Jan. 29, 2015.
(Continued)

Primary Examiner — Colby M Hansen
(74) Attorney, Agent, or Firm — Davis & Bujold PLLC; Michael J. Bujold

(57) ABSTRACT

A drive unit provided with at least one powertrain which is equipped with at least two widely spaced operating points for achieving a high rotational speed spread with a high degree of efficiency. A method for controlling the load speed of a corresponding device, specifically, a wind turbine plant is also disclosed.

17 Claims, 3 Drawing Sheets

(52) U.S. Cl.
CPC ........... *F16H 2200/2005* (2013.01); *F16H 2200/2082* (2013.01); *Y02E 10/70* (2013.01)

(56) References Cited

U.S. PATENT DOCUMENTS

| | | | |
|---|---|---|---|
| 6,054,776 A | 4/2000 | Sumi | |
| 6,537,169 B1* | 3/2003 | Morii | F16H 3/721 475/10 |
| 8,790,203 B2 | 7/2014 | Hehenberger | |
| 2002/0117339 A1 | 8/2002 | Nakashima | |
| 2012/0302388 A1* | 11/2012 | Scekic | F03D 11/02 475/31 |
| 2014/0046614 A1* | 2/2014 | Pettersson | G01M 13/021 702/113 |

FOREIGN PATENT DOCUMENTS

| | | |
|---|---|---|
| DE | 43 19 823 A1 | 12/1994 |
| DE | 196 29 417 A1 | 2/1998 |
| DE | 198 18 108 A1 | 11/1998 |
| DE | 10 2006 001 806 A1 | 7/2007 |
| DE | 10 2008 047 261 A1 | 4/2010 |
| EP | 0 710 787 A2 | 5/1996 |
| JP | 2009-120105 A | 6/2009 |
| WO | 2011/000008 A1 | 1/2011 |

OTHER PUBLICATIONS

Written Opinion Corresponding to PCT/EP2014/002379 dated Jan. 29, 2015.

* cited by examiner

DRIVETRAIN AND METHOD FOR DRIVES HAVING WIDELY SPACED OEPRATING POINTS

The invention relates to a device provided with at least one powertrain/drive, with at least two widely spaced operating points for achieving a high rotational speed spread with a high degree of efficiency in a powertrain. The invention further relates to a method for controlling the load speed of a corresponding device; specifically, a wind energy plant.

The invention relates to all drive situations whose load cases are characterized as follows:

(i) There are two operating points or areas whose speed is apart by a factor significantly greater than 1, in particular greater than 10 according to amount.

(ii) The power demand is about the same in both operating points/areas.

(iii) In both operating points/areas, a high efficiency in the drive is to be achieved.

(iv) The transition between the operating points or areas should occur without interruption of the controllability, the torque or the rotation, apart from a possible reverse point of the output direction of rotation.

A typical application is wind energy converters, which with one or more aerial vehicles transform mechanical energy into electrical energy by means of the yo-yo principle via one or more tensile tethers (6) connected to a ground station. Such plants are known from DE2006001806, CA2730939, DE3209368, DE4319823, DE19629417 and DE102008047261. This cycle consists of at least the phases A—extending and E—retracting. When extending, the base station operates in generator mode and releases the tension tether at a slower speed and higher force. When retracting, the base station operates in motor mode and retracts the tensile tether at a faster speed and lower force. The overall efficiency of the system depends greatly on the speed ratio between the retracting phase E and the extending phase A. The optimum speed ratio is dependent on the difference in the aerodynamic characteristics (e.g. glide ratio) and the flight path of the aerial vehicle between the operating phases E and A, and is 10:1 or more according to amount with highly developed aerial vehicles.

The problem underlying the invention is to create a powertrain that has a high efficiency in two operating points or ranges with the greatest speed difference. In addition, the load controllability in speed and/or torque must be ensured over the entire area between the operating points/ranges. At the same time, the total rated power of all drives to be installed should be as low as possible. A load controllability is also advantageous in the event of the failure of a drive due to high reliability requirements.

Solutions using a drive which is dimensioned so that it can supply the required power in both operating points/ranges are known. To do this, it may work in the field weakening range in at least one of the operating points. This solution has the disadvantage of a poor efficiency in at least one of the operating points, as well as a still needed oversizing of the main engine despite the potentially large field weakening range for ensuring the large speed spread with sufficient power output in both operating points. In addition, the load control capability is lost in the event of this drive's failure. An increase in the reliability can only be realized here with high additional costs.

Another popular solution is to use a manual transmission (e.g. clutch transmission). A powershift transmission, such as a dual-clutch transmission must be used to achieve a gear change without interruption of torque in the switching time. Manual transmissions lead to higher costs and a higher basic probability of failure. The load controllability at the failure of this drive is also lost here.

Another solution is to use each of the drives for the extending and retracting. Here, the drive power to be installed is great because in each of the operational phases, only 1 drive works. The transfer of the torque from one machine to the other must be done with suitable couplings.

Powertrains, based on the interconnection of two engines on a epicyclic gear are also known. These are common, e.g. in parallel hybrid drives. They serve the power summation of two, usually different engines, such as a combustion engine and an electric engine. For this purpose, the drives are coupled to the differential shafts of the epicyclic gear. In this way, their torques and power add up on the summation shaft which forms the output. This moderate speed operating range is limited to the operating range of the main engine because with a concordant speed of both drives, the output also rotates with an accordingly translated rated speed and with a counterrotating rated speed of the drives, the output only rotates with the accordingly translated difference between the drive speeds. A reversing of one of the two drives usually brings a speed change to the output by only a minor factor, usually near 1.

The so-called "hybrid synergy drive" by Toyota is also state of the art. Here, per drive, an planetary gear is coupled to each shaft. In this arrangement, due to the power balance on the planetary gear a part of the power of at least one of the 3 drives is always fed into at least one other which is afflicted with losses. It is also not intended to increase the output speed by the counter rotation of two drives too greatly, because it is not required to reach a high speed at low torque. The torque should not decrease especially at high speeds. Furthermore, the drive on the carrier of the planetary gear is an internal combustion engine, which can not change the direction of rotation.

The problem is solved according to the present invention in that the powertrain has at least two drives or power machines (A1, A2), whose drive performance is added together by means of an epicyclic gear (3) and is transmitted to the load or a work machine (L).

SUMMARY OF THE INVENTION

The object of the invention is thus a device to achieve a high speed spread at high efficiency in a powertrain of a driven machine or system, consisting of (i) two engine or generator-powered machines (A1, A2), which are indirectly via the appropriate coupling elements, transmission linkages, and/or translation devices (7, 8) or directly with the carrier shaft (S), and the slower of the shafts (2) that determine the fixed carrier train ratio, henceforth referred to as the central shafts of an epicyclic gear (3), connected to each other torque-proof, as well as (ii) a work machine (L), which is indirectly via the appropriate coupling elements, transmission linkages and/or translation or directly with the faster of two central shafts (1) of the epicyclic gear (3) connected to each other torque-proof, where the internal movements of the epicyclic gear (3) is blocked by one or several appropriate coupling device(s) (6) in one rotational direction and approved in the other rotational direction.

It is to be clarified that according to the invention, the terms "drive" and "main engine" are used interchangeably with the term "power machine" (A1, A2). Likewise, the term "load" or "load machine" is used interchangeably with the term "work machine" (L).

According to the invention, each of the two power or drive machines (A1, A2) may be functionally connected with other, in particular one, two, three or four engines. Likewise, the work machine (L) can be functionally connected or coupled with other, in particular one, two, three or four work machines.

According to the invention, each of the two power machines as well as, if applicable, the other connected drives, can have provisional and/or translation devices.

In the following, drive means one or more combined power machines, load means one or multiple distributed machines each including any translation and power summation/distribution devices. The terms drive and load and power and work machine are preserved regardless of the direction of power flow in the following for better understanding. This is expressly but not restrictively meant for the invention. Power can flow both from one or two drives into the epicyclic gear and from the epicyclic gear to the load as well as vice versa. A generator or mixed operation is expressly intended and possible with regard to the invention. In other words, the power machines (A1, A2) can be temporarily operated during a total working process as work machines, and the work machine (L) can be operated as a power machine. This can be practiced, e.g. for an airborne wind turbine as shown in FIG. 5.

With the terms torque, speed and power of a drive or the load, these variables always refer to the respective coupling point to the epicyclic gear (3). In the following torque is always torque on the epicyclic gear shaft.

The object of the invention is in particular a corresponding device in which the coupling device can be structured as follows:

(i) it is formed by a freewheel clutch, (ii) at least one, in particular one, two, three or four coupling device(s) are switched or mounted between the two central shafts (1, 2) of the epicyclic gear.

(iii) at least one, in particular one, two, three or four coupling device(s) are switched or mounted between the carrier shaft (S) and the slower central shaft (2) of the epicyclic gear.

(iv) at least one, in particular one, two, three or four coupling device(s) are switched or mounted between the carrier shaft (S) and the faster central shaft (1) of the epicyclic gear, (v) at least one, in particular one, two, three or four coupling device(s) are switched or mounted between the carrier shaft (S) and one or more planetary gear(s) (P) of the epicyclic gear.

In a further embodiment of the invention, the coupling device (6) is connected with one or more of the involved linkages in a torsionally flexible manner.

In another embodiment of the invention, the epicyclic gear, which can be single-stage or multi-stage, is a planetary gear, or a single-stage or multi-stage planetary gear.

The object of the invention is a corresponding device in which the speed of the optimum machine performance with regard to efficiency of the installed power machines (A1, A2) (including provisional/translation devices) are basically equal or differ from each other to a maximum of 10%, in particular 1%, 2%, 3%, 4%, 5%, 6%, 7%, 8% and 9%.

The object of the invention is a device, where the torques of the optimum machine performance with regard to efficiency of the installed power machines to each other in terms of amount essentially behave like the amount of the reciprocal of the product reduced by 1 from the stationary translation and stationary efficiency in the power flow direction of the epicyclic gear used, or do not deviate more than a maximum of 10%, preferably varying between 0 and 5% from this ratio.

The object of the invention is a device, where the torque/speed characteristics of installed power machines are essentially the same, or at no speed, deviate from each other by more than 10%, preferably varying between 0-5% in the rated torque value.

Furthermore, the object of the invention is a method for the control of load torque of a device as described above and below in operation with a locked coupling device, where speeds are governed by two power machines (A1, A2), with being an embodiment of the invention, where it operates one power machine (A1 or A2) as the master device, and the other (A2 or A1) as a slave device. Here, the target torque of the torque control circuit which as the power machine operated as a slave device can be set to the target torque of, if applicable, a torque control circuit embedded in a speed control circuit which as the power machine operated as a master device is set in a fixed ratio, where in a further embodiment, the ratio of the target torque corresponds to the torque capacity or the rated torque of the power machines. Here, the power machines (A1, A2) which are torque-regulated, can also have control of the maximum speed. Here, the maximum speed of the power machine which is operated as a slave device can be set so much higher than the maximum speed of the other the power machine operated as a master device in such a way that the power machine operated as a slave device only achieves its maximum speed in the event of an error in the system.

The object of the invention is also a method for the control of the load torque of a device described above and below in operation with an opened coupling device, whereby the torque (a) of the power machines (A1, A2) which are coupled to the slower of the central shafts (2) of the epicyclic gears is regulated in the power flow direction based on the negative load setpoint, divided by the product of the stationary translation and the stationary efficiency or (b) of the power machine which is coupled to the carrier shaft (S) of the epicyclic gear is regulated in the power flow direction based on the load setpoint, divided by the product of the stationary translation and the stationary efficiency reduced by 1, as well as with (a) and (b), the speed of the other drive machines is regulated at a specific value.

The object of the invention is also an appropriate method for the regulation of the load torque of a device described above and below in operation with an opened coupling device, whereby the speeds of both power machines (A1, A2) are regulated in such a way that the product of the stationary translation and speed of the drive coupled to the slower of the central shafts (2) of the epicyclic gear, reduced by the product of the stationary translation, reduced by 1 and the speed of the other drive, corresponds to the load target speed. Here, the speed of both power machines can each be regulated (with regard to amount) based on the target speed of the output, divided by the doubled stationary translation of the epicyclic gear which is also reduced by 1.

The powertrain devices in the invention are suitable in particular for their use in wind turbines, preferably airborne wind turbines. The object of the invention is therefore also an airborne wind turbine, which is operated by means of the invented powertrain device.

DETAILS OF THE INVENTION

The linkages of an epicyclic transmission are designated as usual with 1, 2 and S, where S is the carrier shaft and 1 and 2 denote the central shafts. The fixed carrier train ratio $i_{12}$ is defined as the ratio of the speed of shaft 1 to shaft 2 with the carrier held fixed and forms an operation-independent design feature of the transmission. The slower (in terms of amount) of the central shafts is hereafter referred to as 2, the faster as 1, so that the stationary translation (in terms of amount) is hereafter always greater than or equal to 1. The known speed equation is as follows:

$$\omega_1 - \omega_2 i_{12} - \omega_S(1-i_{12}) = 0 \tag{1}$$

for the speeds of the transmission links $\omega_1 \omega_2$ and $\omega_S$. The torques of the links of an epicyclic gear are divided according to fixed, ratios dependent on the stationary translation $i_{12}$ and the stationary efficiency $\eta_{12}$:

$$M_2/M_1 = -i_{12}\eta_{12}^{w1} \text{ and } \frac{M_S}{M_2} = 1/(i_{12}\eta_{12}^{w1}) - 1 \tag{2}$$

The exponent w1 is defined here as the sign of the incoming power on shaft 1:

$$w1 = \text{sgn}((\omega_1 - \omega_S)M_1) \tag{3}$$

Overall, the torque equilibrium always prevails $$M_1 + M_2 + M_S = 0 \tag{4}$$

between the torque $M_1$, $M_2$, and $M_S$ applied to the transmission links.

According to the invention, one of the drives is coupled torque-proof to the carrier shaft (5), the second drive to the slower (with regard to amount) running of the central shafts (2) and the load (L) to the faster running of the central shafts (1). Moreover, according to the invention, between at least one pair of randomly movable linkages of the epicyclic gear, a freewheel coupling (6) is mounted, which releases the linkages coupled by it in a relative rotation direction to each other—hereinafter called the E mode—and which blocks the other relative rotation direction of the involved linkages—hereinafter called the A mode. In this way, any internal movements of the epicyclic gear should be blocked in a direction of rotation so that it is only able to rotate as a whole relative to the frame in this direction. In this mode, the drives (AS, A2) are therefore forcibly coupled at the same speed. The torques which are needed to satisfy the equations text internal, applies the freewheel coupling (6) to the involved linkages in mode A at least partly.

A freewheel can be mounted either between one or several external pairs of transmission linkages 1-2 (shown in figure), 1-S, S-2 or, if structurally possible, also between one or more continuous transmission linkages, for example between one or possibly more planetary gears P and the carrier S (shown in figure). When installing multiple freewheels, their rotation/blocking direction is to be so chosen so that they open and lock together. By attaching multiple freewheels, the torque to be maintained in mode A can be divided into mode A thus potentially saving construction space or costs. In an advantageous form, the freewheels are elastically coupled on the involved linkages in order to ensure that all freewheels take effect and are not blocked earlier due to production inaccuracies and differing degrees of stiffness in the components of one of the freewheels thus preventing the blocking of others. In the following, for reasons of simplification, one single freewheel will be discussed. Sign rule: In the case of the blocked freewheel (mode A) and the aligned drive torque, the output torque is oriented positively, and by implication, the drive torque negatively.

The invention is not confined to gears with the kinematic degrees of freedom 2. Transmissions/gears with a higher degree of freedom can be used. The other free linkages can be coupled, e.g. with other linkages or the frame to get a multi-stage three-shaft transmission, or more drives can be coupled to add their power to the output power.

In the locked mode A, the fixed torque distribution of the epicyclic gear is guaranteed by the freewheel according to the equation (b). Viewed from the drives, it no longer applies, rather the torque ratio of the drives can be freely adjusted by a torque regulation or other devices or measures. The torque equilibrium $$M_{AS} + M_{A2} + M_L = 0 \tag{5}$$

for the torques of the drives $M_{AS}$, $M_{A2}$ and the load $M_L$, must still be present. In mode A, the area I, III, IV, V and VI is accessible according to FIG. 4.

Since both drive shafts in mode A rotate in the same direction, a beneficial operating mode exists when unidirectional torques are applied to the drive shafts. Then their shaft power is also rectified and on the output shaft, the sum of the drive power and the sum of the drive torques can be called up with speed of the drive shafts. Otherwise, a portion of the drive power of one of the drives would be discharged again by the other drive and would not be available for output. This unwanted portion of the operational area from mode A is called the A* mode in the following. The efficiency of epicyclic gear in blocked mode A is 1. If the torque ratio of the drives satisfies the equation (b), the freewheel is torque-free. The system is exactly at the transition between mode A and mode E with the same speed of the drive shafts.

In free-running mode E, the torques are divided among the drives according to equation (b). In mode E, the area II, III, IV, V and VI is accessible according to figure.

Because the drives are mounted to the shafts S and 2, their torques are usually (if $|i_{12}\eta_{12}^{w1}|>1$ is true) acting in opposite directions. In a more advantageous mode, they are given oppositely directed rotation directions. Then their shaft power is also rectified and on the output shaft, the sum of the drive power can be called up with higher speed. Otherwise, a portion of the drive power of one of the drives is discharged again by the other drive and will not be available to the output. This unwanted portion of the operational area from mode E is called the E* mode in the following. The efficiency of the epicycle gear in the free-running mode E is equal in magnitude to the greater speed of the drive shafts with gear units with positive stationary translation (plus gearing) a little under the stationary efficiency $\eta_{12}$; with negative stationary translation (minus gearing), a little above.

Through the invention, the torques of the torque/speed characteristics of the drives in mode A add up to the characteristic at the output in the range of the larger of the two negative to the smaller of the two positive maximum speeds of the drives.

Mode E, the characteristic is limited in the negative speed range through the speed $\omega_1$ according to the equation (a) with $\omega_2$=max. pos. speed drive A2 and $\omega_s$=max. neg. speed drive AS, as well as in the positive speed range through the smaller of the two positive maximum speeds of the drives. The torques are limited both positive as negative to the value $$M = \min\left(\left|\frac{M_{2max}}{-i_{12}\eta_{12}^{w1}}\right|; \left|\frac{M_{Smax}}{i_{12}\eta_{12}^{w1} - 1}\right|\right) \tag{f}$$

where $M_{2max}$ and $M_{Smax}$ designate possible maximum torques of the drives on linkage 2 and linkage S at the current speed for the duration of this status. The operation areas of the two modes overlap.

The speed spread $k_D$, defined as the ratio between the output speed $\omega w_{L2}$ with counterrotating direction with $+\omega$ and $-\omega$ drives (mode E) and the output speed $\omega_{L1}$ in same rotation direction with $\omega$ rotating drives (mode A), is $$k_D = \left|\frac{\omega_{L2}}{\omega_{L1}}\right| = |2i_{12} - 1| \quad \text{(g)}$$

The torque spread $k_M$, defined as the ratio between the output torque $M_{L2}$ with counterrotating drive torques $+M$ and $-M$ (mode E) and the output torque $M_{L1}$ with concordant rotating drive torques of the size (mode A), is $$k_M = \left|\frac{M_{L1}}{M_{L2}}\right| = |2i_{12} - 2| \quad \text{(h)}$$

for minus transmissions, $k_M = k_D + 1$ applies, for plus transmissions $k_M = k_D - 1$.

The ratio of $k_D$ and $k_M$ are determined under theoretical conditions.

The ratio of output power $PL_1$ and $PL_2$ under the above mentioned conditions is $k_M/k_D$.

In an energetically and economically advantageous characteristic of the invention, on both drives, the machine and/or the translation of an eventual primary gear on both drives are chosen so that the optimum machine performance of both drives are at the same speed. Using this measure, both drives can be operated in mode A due to the fixed, equal speed, but the arbitrary torque distribution of both drives are operated simultaneously with regard to speed and torque in the optimum machine performance.

In another energetically and economically advantageous form of the invention, on both drives, the machine and/or the translation of an eventual primary drive are chosen so that the ratio of the torques are in the optimum machine performance of both drives.

$$\left|\frac{M_S}{M_2}\right| = \left|\frac{1}{i_{12}\eta_{12}^{w1}} - 1\right| \quad \text{(i)}$$

is Using this measure, both machines can be operated in mode E due to the fixed, unequal torque distribution according to equation (b), but the arbitrary speed ratio of both machines can be operated at the same time or in terms of speed and torque in the optimum machine performance.

Particularly advantageous, both energetically and economically, is to meet both conditions meaning installing drives with identical optimum machine performance speed and a ratio of the torques in the optimum machine performance according to the equation text. In this way, the drives can be operated at the same time in both modes A and E both with regard to speed and in terms of torque in the optimum machine performance.

In other cases, it can again be technically or economically beneficial to install 2 of the same drives. In mode A, both machines can both continue to be operated at the same in their optimum machine performance with regard to speed and torque, while in the E mode they both can both be operated simultaneously at optimum machine performance with regard to speed. However with regard to torque, one of the machines must differ from the other machine by the factor according to the equation text, i.e. at least one of the machine cannot work with the other one at the same time in its optimum machine performance. This can mean minor losses in efficiency in mode E. For this, the failure of either of the two machines, half of the drive power is still available. In addition, the procurement and integration effort is less for 2 similar drive systems.

With the use of multiple freewheels, you must ensure that they lock at the same time, so that the locking torque on the freewheels is distributed as evenly as possible. This is not always given due to various major play and stiffness in the involved construction elements. Rather, it can happen that a freewheel locks and bears the full torque, while the other or the others are still unloaded. To counter this, an advantageous form is proposed when using multiple freewheels, one torsionally flexible coupling is to be provided between each freewheel and at least one connection component. This ensures a better distribution of the locking torque on the freewheels as well as a certain shock absorption during the lock operation. From the latter effect, the advantage of a torsionally flexible coupling in use of only one freewheel can result.

The invention can carry out a rated translation i=7, e.g. by means of a single-stage planetary gear. This has a stationary translation of $i_{12}=-6$, therefore a speed spread of $k_D=13$ can be reached according to equation (g). It is proposed as an exemplary execution, to couple two identical electric motors MG with regulated frequency, known as servo motors, via two spur gear stages (7, 8) to the ring gear 2 and the carrier S, as well as the load (L), such as a cable drum, to the sun 1. The planetary gear is stored rotatable to the frame. One freewheel (6) each is placed between the carrier S and planetary gears P, in such a way that with position power, it locks the load (for example, wound up tether under force of the cable drum) and with negative power, both drives (generator mode). In this arrangement, both drives are kinematically equivalently coupled to the epicyclic gear. Their axes are parallel and at the same distance from the equally parallel axis of the load. Such an arrangement can be well integrated into a cable drum.

In another characteristic, only one of the two drive units is mounted on the epicyclic gear axis-offset, the second is mounted coaxially.

In a further characteristic, both machines can be coaxially mounted to the planetary gear, in which at least one of the two machines has a hollow shaft, through which a shaft is fed through to the rear drive machine.

A speed translation between electric motor and input in the planetary gear can be provided in all cases.

In all these characteristics, the rope drum can also be mounted coaxially or via a spur gear or traction drive axis-offset to the planetary gears. A speed translation between the planetary gear's sun gear and the cable drum can be provided in all cases.

Alternatively, to regulate the torques or the speed of the output, the following procedures are proposed. One of the drives is hereinafter referred as the master, the other as the slave.

Mode A: If the system is in mode A (the freewheel is locked) and the load torques should be regulated, the torques of both drives are regulated in accordance with the invention. This can be done for simplicity's sake on each half of the negative target torque $M_{1soll}$ of the output. But also every other torque ratio between the two drives is possible within their characteristics. If the load is to be speed-regulated in mode A, the master drive is speed-regulated, the slave drive torque-regulated. In both cases, the slave drive receives at any time an advantageous form as the setpoint, the current torque setpoint $M_M$ of the master drive, multiplied by the ratio $k_{2S}$. An appropriate value for $k_{2S}$ is the ratio of the torque capability, for example the rated torques, from slave drive to master drive. With identical drives $k_{2S}=0.5$. If there is a speed or speed limit control in the master drive, the value which is to be use for $M_M$ is the one which is output from this as the reference variable for the torque regulation. In this way, the load torques are divided both in the torque control mode, as well as for a possibly engaged speed control of the master drive in accordance with the load capacity of the drives. Compared to a purely load-dependent torque specification (fixed distribution of the load torque) for each of the two drives, there is an advantage that when a possible speed control of the master drive engages, the torque of the slave drive is controlled with this and can thus contribute to maintaining the target speed. To this end, the slave drive should have an equally large or larger allowed maximum speed than the maximum regulated speed of the master drive. Any possible own speed limit control of the slave drive is set to a maximum value higher than that of the master drive. Proposed is a limit so much higher that the speed limit regulation takes control of the slave drive only with non-functioning of the speed limit regulation of the master drive or the mechanical coupling of the drives.

Mode E: If the system is in the mode E (the freewheel is open) and the load torques are to be regulated, either drive A2 forms the master drive in accordance with the invention and is regulated to the value $$M_2 = \frac{M_{1soll}}{-i_{12}\eta_{12}^{wl}} \quad (j)$$

regulated, or the drive AS is the master drive and is regulated to the value $$M_S = \frac{M_{1soll}}{i_{12}\eta_{12}^{wl} - 1} \quad (k)$$

The respective other drive is the slave drive and is speed-regulated.

In both cases, it is proposed to regulate the speed of the slave drive to the value, which produces the lowest total loss of power of both drives. For drives with the same course of loss of power as a function of the speed, that is the negative speed of the master drive so that both turn equally fast.

If the load speed is to be regulated in mode E, it is proposed with regard to the invention, to regulate the speeds of both drives instead of the torque regulation in the master drive. The following must apply:

$$\omega_2 i_{12}+\omega_s(1-i_{12})=\omega_{1soll} \quad (l)$$

It is advantageous to select the speeds of the drives so that the total loss of power of the two drives will be minimal. For actuators with same course of loss of power as a function of the speed, each amount is $$|\omega_{soll}| = \frac{\omega_{1soll}}{2i_{12} - 1} \quad (m)$$

for each drive. The direction of rotation is to be selected positively for drive A2 and negatively for drive AS.

Transition: In the workspace of the amount-related load speeds between 0 and the amount-related smaller of the limiting speeds of the drives and a load torque greater than 0 and less than the value according to equation (f), the system can be operated in both mode A and mode E. A transition between modes A and E is possible in this subarea III of the identification field (FIG. 4). Area III is further divided into areas where the quasi-static operation with the blocked freewheel is energetically more favourable and an area where the operation with an open freewheel is energetically more favourable. The limit function between these subareas can be determined from equating the functional equation for the sum of the power losses of both drives in mode A with the mode in E. Assuming that the exponent of the power of the load torque which the torque-dependent portion of the total loss of power of the drive is linearly dependent on is equal to the exponent of the power of the drive speed which the speed-dependent portion of the total loss of power of the drives is linearly dependent on, a straight line results. Thus, it can be simply assumed with, e.g. electrical machines that a portion of the loss of power is exclusively a square function of the torque, and another portion of the loss of power is exclusively a square function of the speed.

In this case, the function of same loss of power results in the modes A and E on $$\left|\frac{M_1}{\omega_1}\right| = \sqrt{\frac{C_\omega\left(\frac{1}{(2i_{12}-1)^2} - 1\right)}{C_M(i_{12}\eta_{12}^{wl}(i_{12}\eta_{12}^{wl} - 1) - k_{2S}^2 + k_{2S})}} \quad (6)$$

with the proportionality factor $C_M$ between the square of the torque and power loss and the proportionality factor $C_\omega$ between the square of the speed and power loss.

According to the invention, it is proposed to perform the switching between modes on the transition of the torque operating point via this function.

To prevent drastic speed and torque surges at the transition point, it is proposed to make the transitions with a ramp-shaped course. For example, the transition from mode A to mode E can consist of 2 stages: In the first phase, the free progression is released in random progression up to the transition point. At the transition point, the relevant drive becomes acceleration-free and is switched torque surge-free from torque to speed control. In the second phase, the drives are driven in random progression at the prescribed speed values. The steepness of the progressions can be specified by the maximum allowable angular acceleration or maximum torque gradients to be allowed in the powertrain.

The higher power losses can be offset during the switching phase against the savings arising as a result of the change into the cheaper mode if still in the AE area. A mode change may not possibly be worthwhile if the dwell time in the cheaper other mode is likely to be short-lived.

Likewise, the increased acceleration effort of the drives which can occur due to a more distance change into the other mode from a zero transition of the speed, can be used to further optimize the switching point. Here, only negligible saving are expected, however, with conventional drives with higher acceleration capability.

The invention makes it possible for the powertrain drives to be able to work in at least two operating points at optimum efficiency. The tether controllability is ensured in the entire speed range between the operating points. Due to the performance summation, the total installed rated power of all drives must only be as large as the maximum power requirements in the operating points (e.g. retracting or extending).

FIGURES

Figure 1:
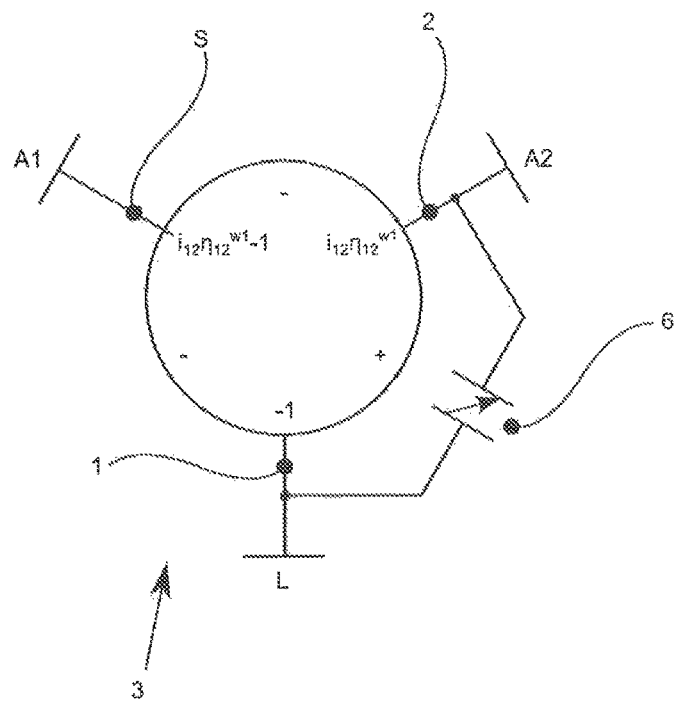
FIG. 1 shows a Wolff diagram of the invention with a gearing with a negative fixed carrier train ratio; the summation shaft is the carrier shaft S.
Figure 2:
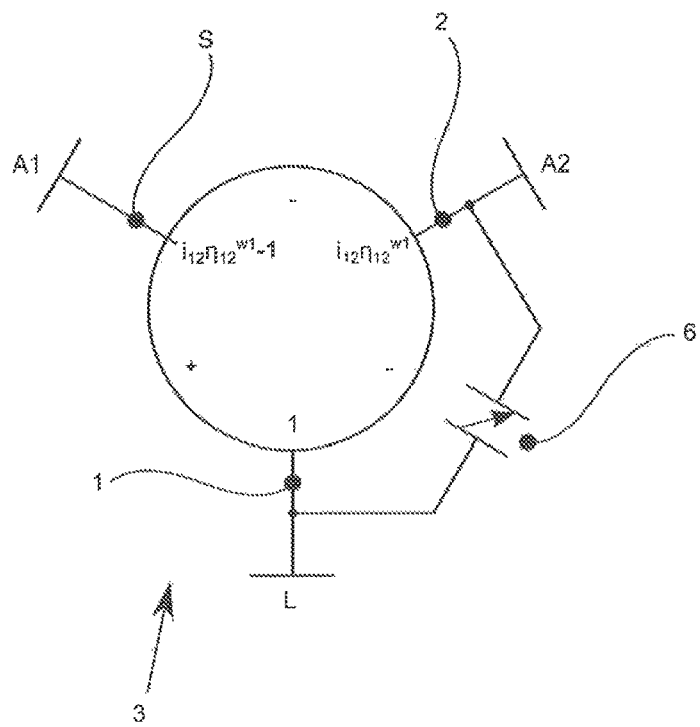
FIG. 2 shows a Wolff diagram of the invention with a gearing with a positive fixed carrier train ratio; the summation shaft is the central shaft 2.
Figure 3:
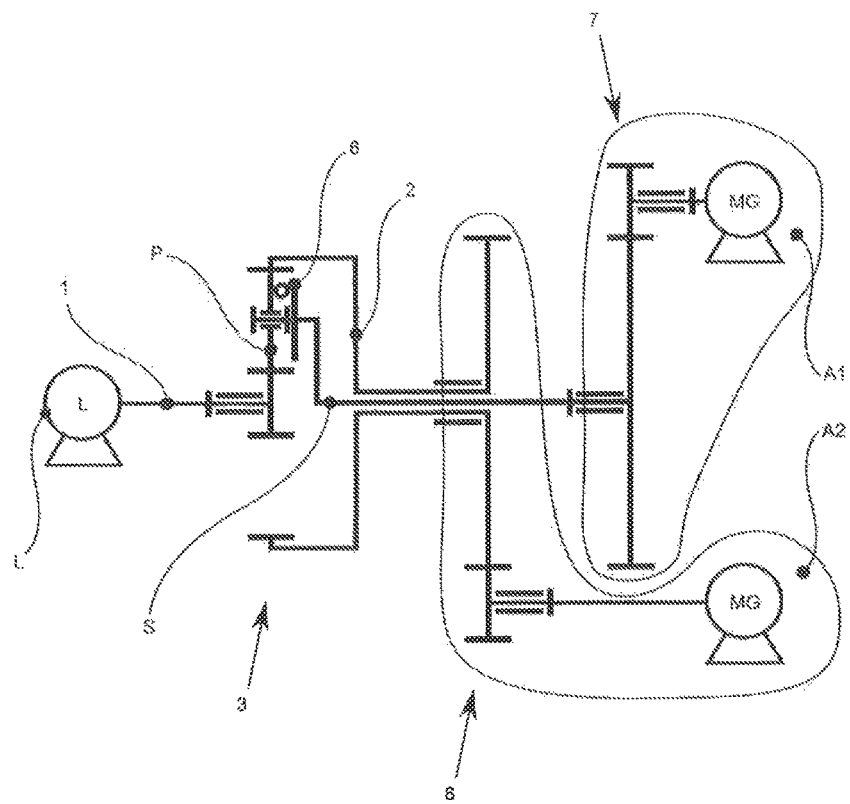
FIG. 3 shows an example with 2 power machines MG, via 2 identical spur gear stages (7, 8) coupled to an epicyclic gear (3).
Figure 4:
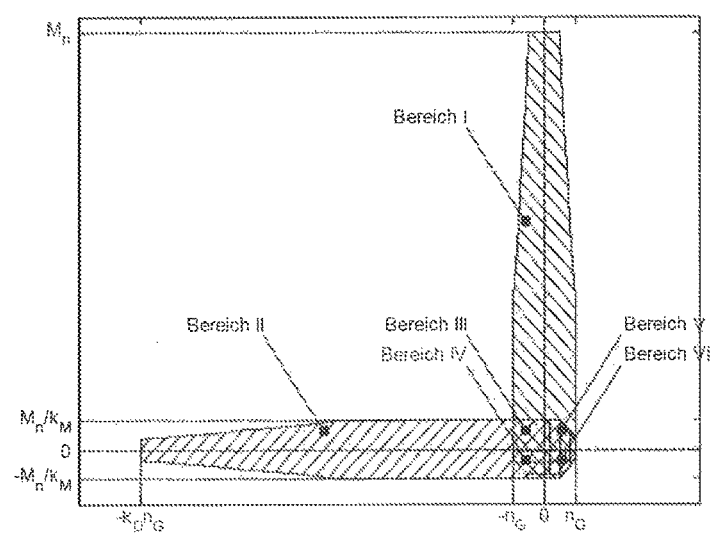
FIG. 4 shows the characteristic of the invention powertrain into 4 quadrants as examples for 2 synchronized servodrives and minus gearing.
Figure 5:
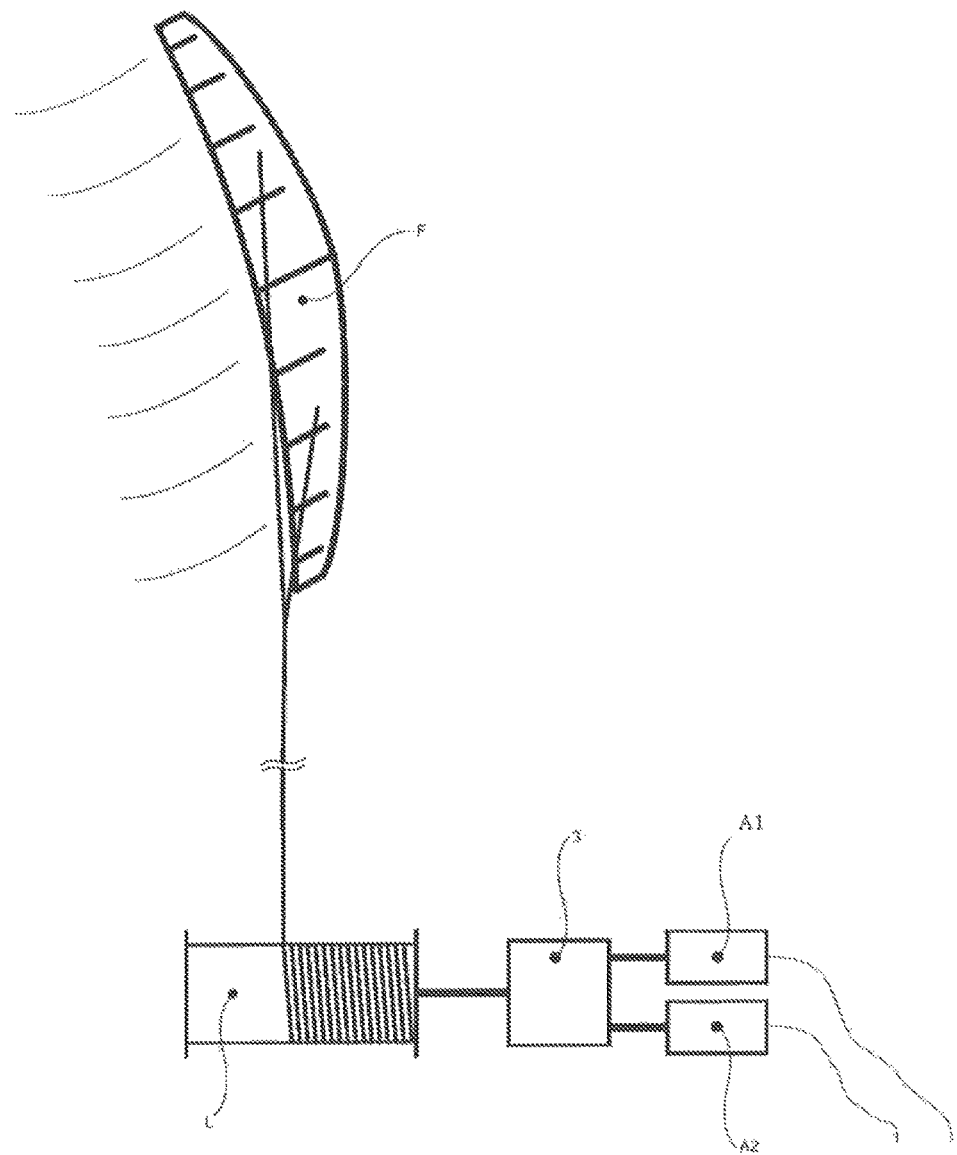
FIG. 5 shows the use of the invented powertrain device in an airborne wind turbine with extendible and retractable wind sails.

The invention claimed is:

1. A device to achieve a high speed spread at high efficiency in a powertrain of a driven machine or system, the device comprising:
(i) a first power machine (A1) and a second power machine (A2) which are indirectly—via appropriate coupling elements, transmission links or translation devices (7, 8)—or directly torque-proof connected to a carrier shaft (S) and a slower transmission central shaft (2), respectively, of an epicyclic gear (3) that determine a fixed carrier train ratio, and
(ii) a work machine (L) which is indirectly—via the appropriate coupling elements, transmission links or translation devices—or directly torque-proof connected with a faster transmission central shaft (1) of the epicyclic gear (3), and
(iii) at least one coupling device (6) which blocks internal movements of the epicyclic gear (3) in a first rotational direction and permits the internal movements in an opposite rotational direction,
further comprising one of the following:
at least one of the coupling devices (6, 7, 8) is torsional flexibly connected with one or several of the involved transmission linkages of the device, or
a speed for optimum machine performance with regard to efficiency is essentially same or deviates from the first and the second power machine by a maximum of 10%, or
a ratio of torque of optimum machine performance with regard to efficiency of the first and the second power machines is essentially equal to an absolute value of a term defined by a reciprocal of a product of a stationary translation and a stationary efficiency in a power flow direction of the epicyclic gear, reduced by 1, or does not deviate more than a maximum of 10% from this term.

2. The device according to claim 1, wherein the at least one coupling device (6) is formed by a freewheel coupling 6).

3. The device according to claim 1, wherein at least one coupling device is located between the transmission shafts (1, 2) of the epicyclic gear.

4. The device according to claim 1, wherein the at least one coupling device is located between the carrier shaft (S) and the slower stationary transmission shaft (2) of the epicyclic gear (3).

5. The device according to claim 1, wherein at least one coupling device is located between the carrier shaft (S) and the faster stationary transmission shaft (1) of the epicyclic gear (3).

6. The device according to claim 1, wherein at least one coupling device is located between the carrier shaft (S) and one or more planetary gears (P) of the epicyclic gear (3).

7. The device according to claim 1, wherein at least the first and the second power machines (A1, A2) is functionally connected with at least a further power machine.

8. The device according to claim 1, wherein at least one work machine (L) is functionally connected with at least one further work machine.

9. A method for control of a load torque of the device according to claim 1, wherein the coupling device (6) is disengaged during operation (Mode E), the method comprising
(i) controlling torque of
(a) the first or the second power machine (A1 or A2) which is coupled to the slower transmission shaft (2) of the epicyclic gear (3) based on the negative load setpoint, divided by a product of a stationary translation and a stationary efficiency in the power flow direction, or
(b) the first or the second power machine (A1 or A2) which is coupled to the carrier shaft (S) of the epicyclic gear (3) based on a load setpoint, divided by a product of the stationary translation and the stationary efficiency in the power flow direction reduced by 1, and
(ii) for both steps (a) and (b), maintaining the speed of the other of the first or the second power machine at a specific target value.

10. The method according to claim 9, further comprising maintaining the speed-controlled drive at a speed value which creates a least total loss of power in both the first and the second power machines.

11. The method according to claim 9, further comprising maintaining a speed of the speed-controlled first or second power machine at a negative value of a speed of the other the first or the second power machines.

12. A method of controlling a load speed of the device according to claim 1, wherein the coupling device (6) is disengaged during operation (Mode E), the method comprising:
regulating speeds of both the first and the second power machines (A1, A2) such that a product of the stationary translation and a speed of the drive coupled of the slower transmission shaft (2) of the epicyclic gear (3), reduced by a product of a stationary translation, reduced by 1 and a speed of the other drive, corresponds to a load target speed.

13. The method according to claim 12, further comprising maintaining an absolute value of a speed for both the first and the second power machines at a ratio of a target speed of an output, and a term defined by a doubled stationary translation of the epicyclic gear reduced by 1.

14. An airborne wind energy converter with extendible and retractable wind sails and a powertrain device to achieve a high speed spread at high efficiency, the powertrain device comprising
(a) a first power machine (A1) and a second power machine (A2), (b) a work machine (L), and
(c) an epicyclic gear (3) having a stationary translation value which is greater than 1 in terms of amount, and comprising the following transmission linkages:

an input transmission carrier shaft (S), a slower input transmission central shaft (2), a faster output transmission central shaft (1), and at least one freewheel coupling device (6) which blocks internal movements of the epicyclic gear in a first rotational direction and permits the movements in an opposite rotational direction; wherein
  (i) the transmission carrier shaft (S) is torque proof connected to the first power machine (A1) to form drive (A-S), the slower transmission central shaft (2) to the second power machine (A2) to form drive (A-2), and the faster transmission central shaft (1) to the work machine (L),
  (ii) in a first operating mode (Modus A), the drives (A-S) and (A-2) are forcibly coupled at the same speed by the at least one freewheel coupling device (6) and have the same rotational direction, and unidirectional torques are applied to the transmission shafts (2) and (S), to call up, on the output transmission central shaft (1), the sum of the input power with the speed of said drive shafts, and
  (iii) in a second operating mode (Modus E), the movable transmission linkages and the drives (A-S) and (A-2) are released by the freewheel coupling device (6) which have the opposite rotational direction, to call up, on the output transmission central shaft (1), the sum of the input power with a higher speed.

15. An airborne wind energy converter according to claim 14, wherein, in connection with Modus E, the higher speed corresponds to a product of the stationary translation and a speed of the drive (A-2) coupled to the slower transmission central shaft (2), reduced by a product of the stationary translation reduced by 1 and a speed of the other drive (A-S).

16. An airborne wind energy converter according to claim 14, wherein the epicyclic gear (3) comprises a ring gear and a sun gear.

17. An airborne wind energy converter according to claim 14, wherein the work machine (L) comprises a cable drum connected to the wind sails.

* * * * *